United States Patent [19]
Vogel

[11] 3,862,571
[45] Jan. 28, 1975

[54] MULTIELECTRODE CAPACITIVE LIQUID LEVEL SENSING SYSTEM

[75] Inventor: Ronald F. Vogel, Bettendorf, Iowa

[73] Assignee: Agridustrial Electronics, Inc., Bettendorf, Iowa

[22] Filed: Aug. 6, 1973

[21] Appl. No.: 385,831

[52] U.S. Cl............. 73/304 C, 324/60 C, 324/60 P
[51] Int. Cl............................................. G01f 23/26
[58] Field of Search ....... 73/304 C; 324/61 P, 61 C, 324/61 QL

[56] References Cited
UNITED STATES PATENTS

| | | | |
|---|---|---|---|
| 2,581,085 | 1/1952 | Edelman | 324/60 R X |
| 2,720,624 | 10/1955 | Gunst et al. | 324/61 QL X |
| 2,943,258 | 6/1960 | Shawhan | 73/304 C X |
| 3,037,165 | 5/1962 | Kerr | 324/61 P |
| 3,148,314 | 9/1964 | Poneman | 324/61 P |
| 3,543,046 | 11/1970 | Tiffany | 73/304 C X |
| 3,665,209 | 5/1972 | Webb et al. | 324/61 R |
| 3,695,108 | 10/1972 | Wygent | 73/304 C X |

Primary Examiner—Jerry W. Myracle
Assistant Examiner—Daniel M. Yasich
Attorney, Agent, or Firm—Glenn H. Antrim

[57] ABSTRACT

A bridge circuit has in one branch a long capacitive probe and in the other branch a plurality of parallel capacitive probes of different lengths, the probes to be mounted in a storage tank. Inductors used across the respective probes function to subtract the values of capacitances equal to the value of the capacitances of the respective probes when no liquid is present in them, thereby to obtain capacitance readings indicative of only increased capacitances resulting from the presence of liquid. The outputs of the branches resulting from the presence of liquid are compared, and a control voltage is developed for application to a capacitive diode in the one branch of the bridge circuit to maintain the bridge circuit substantially balanced. The control voltage is measured to indicate the level of the liquid in the tank, and the use of a plurality of probes in the other branch extends the useable range of the curve for observable voltage changes. The effect of different densities of liquids is balanced out.

3 Claims, 4 Drawing Figures

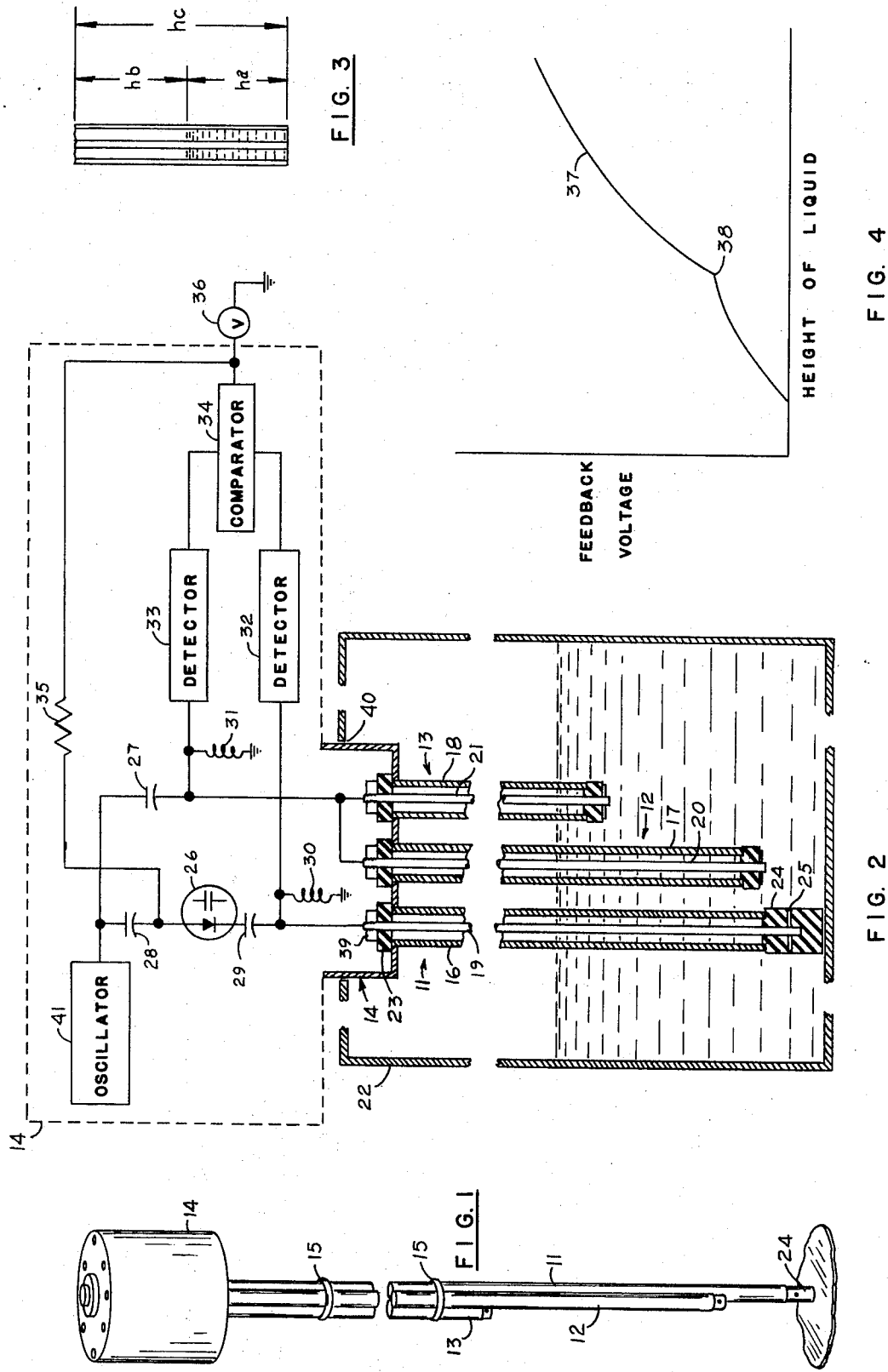

MULTIELECTRODE CAPACITIVE LIQUID LEVEL SENSING SYSTEM

BACKGROUND OF THE INVENTION

This invention relates to indicators of liquid level and more particularly to indicators having capacitive probes adapted to be mounted in containers of liquid.

The amounts of liquids in storage tanks have been measured electrically by use of probes positioned at a predetermined height in storage tanks, the probes having electrical characteristics that vary according to the height the liquid rises about them. Although resistive probes have been used for measuring level of fluids having suitable resistive characteristics, capacitive probes have commonly been used for measuring the level of gasoline and other fuels in storage tanks. The capacitive probes may have two sections, a short section near the bottom of a tank where it is always covered with liquid and a long section extending from the top of the tank downward to a point a short distance from the bottom. The short section is connected in an electrical compensating circuit to compensate for changes in the capacitance of the longer probe caused by changes in temperature and density of the liquid rather than directly by the height of the liquid. When compensation is provided, the measurement of capacitance according to calibration is the amount of liquid in the tank.

SUMMARY OF THE INVENTION

The present indicator system for measuring level of liquid has at least two capacitive probes connected in a bridge circuit, and a preferred embodiment has at least three parallel capacitive probes of different lengths to extend to different depths in the liquid. When three probes are used, the longest probe is connected in a bridge circuit to a first detector circuit, and the other probes, which might be about 95 percent and 85 percent respectively as long as the longest probe, are connected in a parallel circuit as a part of the bridge circuit connected to a second detector circuit. The outputs of the two detectors are connected to a comparator, and the comparator supplies control voltage to capacitive diode that is connected in the bridge circuit in series with the longest probe. The comparator circuit has high gain for supplying sufficient output voltage in response to small input voltage to maintain the bridge substantially balanced, and this output voltage is measured with reference to a calibrated scale to show the amount of liquid in a tank in which the probes are inserted.

This bridge circuit arrangement eliminates changes in reading with changes in density, and the use of the plurality of probes in one branch of the bridge circuit extends the range of the level indicator. For example, by using two probes of different lengths in one branch, level can be measured accurately until the level of the liquid is only about two percent of the depth of the tank in which the probes are inserted above the lower end of the longer one of the two probes. Also, all electrical connections to the probes are made at the top of the tank such that an electrical cable is not required from the top to the bottom of the tank as it is when a compensating capacitive element is used at the bottom of the tank.

BRIEF DESCRIPTION OF THE DRAWING

FIG. 1 is a top, oblique view of the probe assembly having a plurality of probes according to the liquid level indicator of this invention;

FIG. 2 shows an indicator system including a schematic and block diagram of an electronic circuit connected to the probes, the probes being shown in cross section and separated within their upper container for clarity;

FIG. 3 is a diagram showing symbols used in equations relative to the height of liquid in a probe; and FIG. 4 is a graph to show the extension of the sensitive range of the liquid level indicator by the use of a plurality of probes.

DESCRIPTION OF THE PREFERRED EMBODIMENT

The probe assembly of FIG. 1 includes probes 11, 12, and 13 of different lengths. Typically, the probe 11 may be 96 inches long; the probe 12 of intermediate length may be 92 inches long; and the shortest probe may be 84 inches long. The upper ends of the probes 11, 12, and 13 are secured to the bottom of the cylindrical container 14, and the probes are bound together compactly by straps 15 positioned intermediate the ends of the probe and tightened in a usual manner by screws through the ends of the straps.

For clarity, probes 11, 12, and 13 are shown in FIG. 2 separated and mounted in a line within the bottom of the container 14. The container 14 is a sliding fit within the top of a tank 22, and the probe assembly of FIG. 1 is supported by an insulator 24 at the lower end of the longest probe 11. The outer cylindrical conductors 16, 17, and 18 of the probes 11, 12, and 13 respectively may be 1-inch pipes of suitable lengths, and the inner conductors or electrodes 19, 20, and 21 may be ¼-inch conductive pipes or rods.

As shown in FIG. 2 for probe 11, the inner electrode 19 is positioned within the outer conductor or pipe 16 by an upper insulating washer 23 and a lower insulating washer 24. Each washer has a shoulder for centering it in the pipe 16. The lower washer 24 has a central bore such that the washer is a sliding fit over the center electrode 19, and a pin 25 is secured through the lower end of the electrode 19 and through the insulating washer 24. A suitable passageway for flow of liquid is provided through or around the washer 24. The upper insulating washer also has a bore for sliding the washer over the upper end of the center electrode 19, and the extreme upper end of the center electrode 19 is threaded to receive a nut 39 above the washer 23. Obviously, the nut is tightened to secure the center electrode 19 within the outer conductor 16. The probes are suitable for measuring permittivity of liquids such as fuel oils that have low conductivity.

The center electrode 19 of the longest probe 11 is coupled to a capacitive diode 26 to form one branch of a bridge circuit, and preferably the center electrodes 20 and 21 of the probes 12 and 13 respectively are connected in parallel and then connected to the capacitor 27 to form the other branch of the bridge circuit. Only one probe can be used in each branch and still obtain a compensated reading, but the changes in readings at low levels of liquid are not large enough to be readily measureable. The electronics circuits, other than remote indicators, are preferably mounted on a circuit board in the container 14 shown in FIG. 1 connected to the upper ends of the probes 11–13. By using printed and integrated circuits in the container 14 at the upper ends of the probes 11–13, distributed capacitance of the circuits connected to the probes is kept at a minimum so that signal applied to the bridge circuit including the probes can be high in frequency. As described below, the utilization of signal of frequency facilitates the subtraction of the capacitances of the empty probes 11–13 to aid in calibration of the sensing system.

An oscillator 41 is preferably crystal controlled to operate at a typical frequency of 1 megahertz, and the output of the oscillator is connected through a coupling and blocking capacitor 28 to one terminal of the capacitive diode 26. The other terminal of the capacitive diode 26 is connected through a coupling capacitor 29 to the center electrode 19 of the longest probe 11. Also, the output of the oscillator 41 is connected to the capacitor 27 that is a part of the bridge circuit including the parallel, center electrodes 20 and 21 of the other probes 12 and 13. In a usual manner, a terminal of the oscillator 41 is connected to a common ground to complete the circuit to the outer electrodes of the probes 11–13 through the wall of the container 14. An inductor 30 is connected in parallel with the inner and outer electrodes of the probe 11, and an inductor 31 is connected in parallel with the electrodes of both the probes 12 and 13. The value of each of the inductors 30 and 31 is chosen to form a resonant circuit with its respective probe or probes at the operating frequency of the oscillator 41 while the probes are empty. With reference to equations discussed below, the inductors 30 and 31 may be considered as negative capacitances to balance out the respective capacitances of the probes 11–13 while they are empty.

The point in the bridge circuit connected to the longest center electrode 19 is connected to the input of a detector circuit 32, and the point in the bridge connected to the center electrodes 20 and 21 is connected to the input of a detector circuit 33. The direct-current output circuits of the detector circuits 32 and 33 are connected to respective inputs of a comparator 34. The values of the inductors 30 and 31 are such that the voltages applied to the input of the comparator 34 are equal when the probes 11–13 are empty. The output of the comparator 34 is connected through an isolating resistor 35 to that terminal of the capacitive diode 26 that is connected to the coupling and blocking capacitor 28. The comparator 34 includes high-gain amplifier circuits such that the capacitance of the capacitive diode 26 is controlled to balance substantially the bridge circuit for all different levels of liquid in the tank 22. A voltmeter 36 is also connected to the output of the comparator 34 for measuring the voltage that is required to balance the bridge circuit. Through calibration of the voltmeter 36, the level and amount of the lqiuid in the tank 22 is determined.

The operation of the present system to provide accurate readings of level independent of density of the liquid being measured can be understood better with reference to FIG. 3 and the following equations. Let C be the capacitance of a single probe, $h_a$ be the height of liquid within the probe, $h_b$ be the distance between the surface of the liquid and the top of the probe, $e_1$ be the permittivity of the liquid, $e_o$ be the permittivity of air, and F be a constant depending on the physical dimensions of the probe, then
$C = F(e_1 h_a + e_o h_b)$. Let $e_r$ be the relative permittivity of the liquid and substitute $h_c - h_a$ for $h_b$, then $C = Fe_o(e_r h_a + h_c - h_a)$,
or
$C = Fe_o[(e_r - 1)h_a + h_c]$.

Using the reference numerals as shown in FIG. 2 as subscripts associated with the components in the bridge circuit and first considering that the shortest probe 13 and the inductors 30 and 31 are disconnected, then
$C_{27}/C_{26} = F_{12}e_o[(e_r-1)h_{a_{12}}+h_{c_{12}}]F_{11}e_o[(e_r-1)h_{a_{11}}+h_{c_{11}}]$.

The terms $F_{12}e_o\, h_{c_{12}}$ and $F_{11}e_o\, h_{c_{11}}$ are empty capacitances of the probe 12 and probe 11 respectively. Since the cross-sectional dimensions of the probes are the same, the constants $F_{11}$ and $F_{12}$ cancel. Then if the capacitances of the probes 11 and 12 when they are empty can be subtracted effectively through means as through the use of inductors 30 and 31, the equation becomes simply the ratio of the capacitances is equal to the ratio of the heights of the liquid on the respective probes:

$C_{27}/C_{26} = h_{a_{12}}/h_{a_{11}}$.

The equation shows that difference in readings caused by different densities resulting from different fluids and different temperatures is eliminated.

The advantage of using the bridge circuit in so far as eliminating differences in reading resulting from differences in densities and temperatures can be obtained through the use of only one probe in each branch of the bridge circuit. However, the change in output readings, as shown on the voltmeter 36, becomes relatively small when using only two probes as the tank becomes less than about one-tenth full. By adding the third probe 13, the curve 37 in FIG. 4 is modified to provide readings that change significantly over a wider range as the level of the liquid changes while the level is low. The curve 37 above the point 38 shows the output on the voltmeter 36 when the fluid in the tank is above the lower end of the shortest probe 13, and the portion of the curve below the point 38 where the slope of the curve becomes less in a downward direction results from the ratio of capacitances of only the probes 11 and 12 that still extend below the surface of the liquid to extend the range readable on the voltmeter 36. Through the use of two probes 12 and 13 in the same branch of the bridge circuit, significant changes in readings can be obtained when the longer one of these probes extends into the liquid to the depth of only two percent of the height of the tank 22. The use of still additional probes in this branch will appear to make the curve more nearly linear and thereby to extend the readings still farther. The equations for the use of a single long probe in one branch of the bridge and two probes of different lengths in the other branch is:

$C_{27}/C_{26} = H_{a_{12}} + h_{a_{13}}/h_{a_{11}}$.

I claim:

1. A system for measuring level of a liquid comprising:
a probe assembly having at least two elongated capacitive probes of uniform cross section, each of said probes having at least two electrodes with space therebetween to be filled with liquid as a dielectric to the same height as the height of the surface of the surrounding liquid, said probe assembly adapted to hold said probes vertically beside each other in a container for liquid, the lower ends of said probes extending to different predetermined depths, the increased capacitances of said probes caused by presence of liquid being different while the level of liquid in said container is intermediate the upper and lower ends of all of said probes, an electrical circuit including a voltage source and having first and second branches, each connected to an output circuit, said first branch connected to one probe having the longer length, and the second branch connected to at least one of the other of said probes, impedance means in each of said branches connected to said probes effective to balance out the effect of the capacitances of said probes while liquid is not present thereabout, and said electrical circuit operative to provide in said output circuit a difference signal indicative of the ratio of the increased capacitance of that portion of said probe assembly connected in said first branch resulting from presence of liquid to the increased capacitance of that portion of said probe assembly connected in said second branch resulting from presence of liquid.

2. A system for measuring level of liquid as claimed in claim 1 wherein said second branch of said electrical circuit includes a plurality of probes connected in parallel, said probes in said seco d branch extending to different depths within said container such that at least one of said probes in said second branch extending below the surface of liquid in said container while the liquid is at a low level to be measured and at least an additional one of said probes in said second branch extends below the surface at a predetermined level above said low level.

3. A system as claimed in claim 1 wherein said electrical circuit voltage source includes an oscillator connected to said branches, said branches forming a bridge circuit, said oscillator applying high-frequency signal to said bridge circuit, said first branch including a capacitive diode connected to said probe in said first branch, detecting circuit means connected to said probes in each of said branches, and a comparator circuit connected to said detecting circuit means to compare the voltage detected across said probes in each of said branches and to apply the difference thereof to said capacitive diode to balance substantially said bridge circuit.

* * * * *